3,778,397
PROCESS FOR PREPARING RUBBERIZED BITUMINOUS PAVING COMPOSITIONS

Charles R. Gannon and George H. Beddoe, Ashland, Ky., assignors to Ashland Oil, Inc., Houston, Tex.
No Drawing. Filed Mar. 24, 1971, Ser. No. 127,802
Int. Cl. C08c *11/68;* C08f *45/52;* C08i *1/02*
U.S. Cl. 260—28.5 AS                        15 Claims

ABSTRACT OF THE DISCLOSURE

Aqueous emulsions of polymer rubber and aqueous emulsions of asphalt are mixed at temperatures slightly above ambient (90–100° F.) and then combined with heated aggregate in a pug mill to formulate a paving composition. Use of this process minimizes depolymerization of the polymer in the final paving composition during mixing.

FIELD OF THE INVENTION

This invention relates in general to the preparation of asphalt-rubber paving mixtures. More specifically it relates to a method for incorporating rubber polymers into heated mixtures with asphalt and aggregate to formulate a paving composition.

PRIOR ART

Paving compositions comprising asphalt-rubber-aggregate mixtures are well known and have been widely used. Various types of rubber polymers such as butyl, styrene-butadiene, acrylonitrile butadiene, and neoprene have been used as the rubber polymer component. Although solid forms of rubber such as crumb rubber can be used, ordinarily the rubber polymer used is initially in the form of latex, an emulsion of polymer in water. In one method, the latex is added very slowly to the hot asphalt and the mixture is agitated in an open-top tank. The water introduced with the latex is vaporized or flashed overhead by heat supplied to the mixture. This step of addition in the process requires great quantities of heat and a great proportion of time because the latex must be added slowly to avoid foaming problems. More importantly the rubber polymer may depolymerize, particularly when the mixture is stored at an elevated temperature before being pumped to the pug mill. The resulting paving composition as a consequence may be of inferior quality. A further problem is that the viscosity of the polymer-asphalt mixture is so high that it must be heated to temperatures of 350 to 400° F. to enable pumping the asphalt-polymer mixture into a conventional pug mill where it is mixed with aggregate. Asphalt cement need be heated only to about 300° F. to be handled efficiently when not mixed with rubber. At the elevated temperatures required for pumping the polymer-asphalt mixture depolymerization may again take place because of the high temperatures encountered. In another method of making asphalt-rubber polymer mixtures the rubber latex is added directly in the pug mill to the heated asphalt-aggregate mixture. This procedure, as well as often resulting in poor rubber dispersion, requires additional equipment and personnel to dispense the proper amount of rubber latex into the system.

OBJECT OF THE INVENTION

One object of this invention is to provide an improved method of preparing rubber polymer-asphalt-aggregate mixtures wherein depolymerization of the polymer is minimized during the mixing process. Still another object of this invention is to provide a method whereby the rubber-polymer latex and asphalt emulsion can be mixed at temperatures at or slightly above ambient, thus avoiding the need of excessive heating over extended periods of storage time. These and other objects of the invention will become apparent to those skilled in the art by the following description of the invention.

SUMMARY OF THE INVENTION

Briefly stated, our invention comprises a method of forming a rubber polymer-asphalt-aggregate mixture comprising: mixing a rubber polymer latex emulsion and an aqueous asphalt emulsion at temperatures at or slightly above ambient temperature; combining the mixture of asphalt emulsion and latex with aggregate which has been heated to a temperature sufficient to vaporize the water in the latex and asphalt emulsions and to maintain the resultant asphalt-polymer-aggregate mixture at a temperature efficient to enable its use in a conventional paving machine.

DESCRIPTION OF THE PREFERRED EMBODIMENT

In practicing our invention, the asphalt emulsion can be any of the bituminous materials well known to the art, such as coal tar pitches, pyrogenous asphalts, native asphalts, etc. The only requirement is that the bituminous material must, of course, be capable of emulsification with water. Specific examples of the asphalts which may be used are the asphalts obtained from petroleum crude oils, crack tars, gas oil tars, coke oven tars, and Trinidad asphalts. Normally, the preferred asphalt emulsions are those satisfactory for use in building roads, and related uses which meet State and Federal Government specifications and are frequently referred to in the trade as RS, MS, and SS type asphalt emulsions. The weight percent of bituminous material in the asphalt emulsion may vary between 50 percent and 75 percent but preferably should be between about 60 percent and 70 percent, the remainder comprising water and any added emulsifying agents.

Any rubber or elastomeric polymer type latex such as the co- or homopolymers of dienes may be used but those latices which have the lower cost are generally preferred since one of the disadvantages of rubberized bituminous materials is their inherently high cost. Natural rubber latices, styrene-butadiene latices, i.e. GR-S latices, poly-butadiene latices, butadiene-acrylonitrile latices and poly-isoprene latices are representative examples of useful latices. Normally the latices made of styrene-butadiene or neoprene rubber will be preferred. The concentration of polymer in the latex can be from about 40 percent to 80 percent but preferably is in the range of about 60 percent to about 70 percent.

In practicing our invention, first the latex emulsion is mixed with the asphalt emulsion at ambient or slightly above ambient temperature (about 90–100° F.). The ratio by weight of bituminous material in the asphalt emulsion to the polymer material in the latex emulsion can be as low as 12:1 but preferably is in the range of about 66:1 to 32:1 by weight. The resulting mixture of asphalt emulsion and latex emulsion when mixed at a temperature of about 100° F. will still have a viscosity sufficiently low that it may be easily pumped. Moreover, the asphalt emulsion-latex mixture may be easily stored at ambient temperature without any deterioration of the polymer.

When the polymer latex-asphalt emulsion mixture is to be utilized, it is pumped to a pug mill where the mixture is mixed with heated aggregate which has been heated to a temperature sufficiently high to vaporize the water present in the mixture. The aggregate should be heated to a temperature ranging between about 300 and about 450° F. and preferably should be between about 325 and 400° F. Ordinarily the step of adding the heated aggregate to the polymer-asphalt mixture is sufficiently rapid so that little deterioration of the polymer will occur. Moreover, the vaporization of water from the mixture maintains the temperature sufficiently low that depolymerization is minimized. The final temperature of the polymer-asphalt-aggregate paving composition will be about 350° F. In combining the aggregate with the rubber polymer the total weight percent of polymer-asphalt material in the mixture of aggregate, polymer, and asphalt can be between about 4 to 10 percent but preferably is between 5 to 6 percent. The amount of polymer-asphalt mixture will, of course, depend very much upon the type of aggregate used. After the polymer-asphalt-aggregate mixture has been processed through the pug mill, it is ready for immediate use as a paving composition.

Example

A conventional MS 2h asphalt emulsion of 70 percent asphalt and 30 percent water and emulsifying agent (a soap) was prepared from asphalt having an 85/100 penetration. A rubber latex emulsion was prepared containing 42.5 weight percent of solids of SBR rubber in water. The asphalt emulsion and latex were then mixed at a temperature of about 100° F. in two different ratios so that the weight percents of polymer in the total weight of polymer and asphalt solids were 1.5 and 3 percent. Each of these two mixtures was then pumped to a pug mill where they were combined with aggregate heated to a temperature of 425° F. and the water was flashed off to produce a polymer-asphalt-aggregate mixture having a final temperature of 325° F. The weight percent of asphalt-rubber mixture in each of the paving compositions was 5–6 percent, the remainder representing aggregate. When used as a paving composition, this material showed no deterioration caused by depolymerization of the polymer.

We claim the following:

1. A process for preparing a heated rubber polymer-asphalt-aggregate paving composition from an aqueous emulsion of rubber polymer, an aqueous emulsion of asphalt and heated paving aggregate comprising:
    (a) mixing said aqueous emulsion of rubber polymer with said aqueous emulsion of asphalt both being at a temperature of about 90 to about 100° F.; and
    (b) combining the mixture resulting from (a) with said heated paving aggregate, the temperature of said aggregate prior to said combining with the mixture resulting from (a) being sufficient to vaporize water present in the mixture resulting from combining said mixture from (a) and said heated paving aggregate.

2. The process of claim 1 wherein said paving aggregate is heated to a temperature of about 300 to about 450° F.

3. The process of claim 1 wherein said paving aggregate is heated to a temperature of about 300 to 400° F.

4. The process of claim 1 wherein the asphalt emulsion is an emulsion of asphalt having a penetration of about 85/100.

5. The process of claim 1 wherein the emulsion of rubber polymer is an emulsion of a rubber polymer selected from the group consisting of natural rubber, styrene butadiene, polybutadiene, butadiene-acrylonitrile, polyisoprene, and neoprene.

6. The process of claim 1 wherein the mixture of asphalt, rubber polymer, and paving aggregate is mixed in a pug mill.

7. The process of claim 1 wherein the concentration of rubber polymer in the aqueous emulsion of rubber polymer is between about 40 and 80 percent by weight.

8. The process of claim 1 wherein the concentration of rubber polymer in the aqueous emulsion of rubber polymer is between about 60 and about 70 percent by weight.

9. The process of claim 1 wherein the concentration of asphalt in the aqueous emulsion of asphalt is between about 50 and about 75 percent by weight.

10. The process of claim 1 wherein the concentration of asphalt in said aqueous emulsion of asphalt is between about 60 and about 70 percent by weight.

11. The process of claim 1 wherein the asphalt emulsion and rubber polymer emulsion are mixed in a weight ratio of asphalt to rubber polymer of about 12:1 to about 66:1 respectively.

12. The process of claim 1 wherein the asphalt emulsion and rubber polymer emulsion are mixed in a weight ratio of asphalt to rubber polymer of about 12:1 to about 32:1.

13. The process of claim 1 wherein the mixture resulting from step (a) is combined with heated paving aggregate in step (b) in a weight ratio of asphalt and rubber polymer to aggregate of about 4:96 to about 10:90 respectively by weight.

14. The process of claim 1 wherein the mixture resulting from step (a) is combined with heated aggregate in step (b) in a weight ratio of asphalt and rubber polymer to aggregate of about 5:95 to about 6:94 respectively.

15. The process of claim 1 wherein
    (a) said paving aggregate is heated to a temperature of about 325 to about 400° F.;
    (b) said rubber polymer is selected from the group consisting of styrene butadiene and neoprene;
    (c) the concentration of rubber polymer in said aqueous emulsion is between about 50 and about 70 percent by weight;
    (d) the concentration of asphalt in said asphalt emulsion is between about 60 and about 70 percent by weight;
    (e) said asphalt emulsion and rubber polymer emulsion are combined in a weight ratio of asphalt to rubber polymer of about 12:1 to about 32:1; and
    (f) said asphalt and rubber polymer are combined with aggregate in a weight ratio of asphalt and rubber polymer to aggregate of about 5:95 to about 6:94.

References Cited
UNITED STATES PATENTS 2,841,060  7/1958  Coppage _____ 106—277 X
3,497,371  2/1970  Chang _____ 106—277

JOSEPH L. SCHOFER, Primary Examiner

J. B. EVANS, Assistant Examiner

U.S. Cl. X.R.
106—280, 281; 117—162, 168